Sept. 27, 1960     O. R. BRINEY, JR., ET AL     2,953,950

BORING BAR

Filed Aug. 6, 1956

*INVENTORS*
OTTIS R. BRINEY JR.
BY JAMES W. BRINEY
*Whittemore, Hulbert &
Belknap* ATTORNEYS

United States Patent Office 2,953,950
Patented Sept. 27, 1960

2,953,950

BORING BAR

Ottis R. Briney, Jr., and James W. Briney, Pontiac, Mich., assignors to Briney Manufacturing Co., Pontiac, Mich., a corporation of Michigan Filed Aug. 6, 1956, Ser. No. 602,373

15 Claims. (Cl. 77—58)

The present invention relates generally to a connector and more specifically, to an adjustable boring bar.

It is an object of the present invention to provide a connector or boring bar with means providing for effecting accurate adjustment between parts thereof without the necessity of unclamping and clamping fastening elements.

It is a further object of the present invention to provide connecting structure comprising a first body, a shaft having a first portion pivotally mounted on said body for angular adjustment therein, said shaft having a second portion eccentric with respect to said first portion, a second body pivotally mounted on said second shaft portion, said first body having a portion abutted by a portion of said second body remote from its pivot mounting on said shaft, means for effecting angular adjustment of said shaft and means to maintain said body portion in abutment.

More specifically, it is an object of the present invention to provide structure of the character described comprising a block slidably received between spaced walls of a body, said block and walls having aligned openings, a shaft having portions received in all of said openings, the shaft portions received in the wall openings being concentric with each other, the shaft portion received in the opening in said block being eccentric to the other shaft portions, and friction means opposing rotation of said shaft.

It is a further object of the present invention to provide structure as described in the preceding paragraph in which the block is rotatable about said shaft, resilient means acting between said body and said block to urge said block into engagement with said body.

It is a further object of the present invention to provide structure as described in the preceding paragraph in whch said block is provided with an adjustable abutment engageable with a portion of said body to limit turning of said block about said shaft.

It is a further object of the present invention to provide structure of the character described including a shaft having spaced concentric portions and a portion intermediate said concentric portions which is eccentric thereto, one of said concentric portions being smaller than said eccentric portion and the other concentric porton being larger than said eccentric portion, means providing generally aligned openings in which said shaft portions are received, and pre-loaded ball bearings intermediate all of said shaft portions and the openings in which they are received.

It is a further object of the present invention to provide structure as described in the preceding paragraph in which said pre-loaded ball bearings are provided by a single bearing retainer having openings, and ball bearings in said openings providing for assembly of the structure by insertion through the wall opening adapted to receive the larger of said concentric shaft portions.

Other objects and features of the invention will become apparent as the description proceeds, especially when taken in conjunction with the accompanying drawings, wherein.

Figure 1:
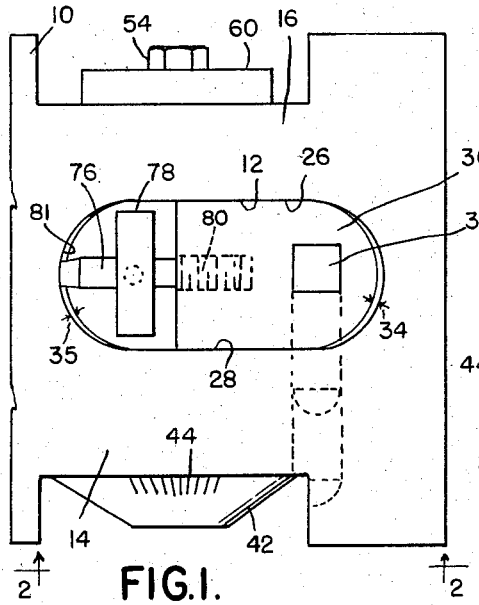
Fig. 1 is a side elevation of a boring bar or head constructed in accordance with the present invention.
Figure 4:
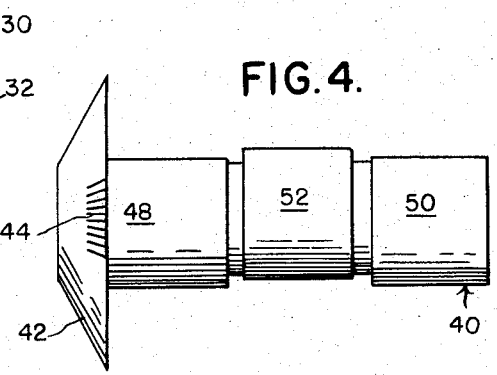
Fig. 4 is an elevational view of the shaft employed in the present invention.

Referring now to the drawings, the boring bar or body 10 is provided with a through opening 12 located adjacent but spaced from the end of the body and providing laterally spaced parallel walls 14 and 16. The walls 14 and 16 are provided with openings 18 and 20 respectively in which are pressed hardened annular bearings 22 and 24 respectively. The internal diameter of the bearing 22 is preferably slightly larger than the internal diameter of the bearing 24 for a purpose which will presently appear.

Slidably received between the walls 14 and 16 and particularly between flat parallel surfaces 26 and 28 thereof, is a block 30 illustrated as a tool block having a bit 32 carried thereby. As best seen in Fig. 1, it will be observed that the width of the block 30 is substantially less than the width of the opening 12, clearance being indicated at 34 and 35. If desired, the block 30 may be urged against one of the surfaces as for example the surface 26, by resilient means such for example as springs 36 held in place by threaded plugs 37.

The block 30 is preferably formed of hardened steel and is provided with a cylindrical opening 38. The internal diameter of the opening 38 is intermediate that of the bearings 22 and 24 for a purpose which will subsequently appear.

The openings afforded by the bearings 22 and 24 are concentric and are adapted to receive a shaft 40 having an enlarged head portion 42 provided with indicia indicated at 44 cooperable with a gauge line 46 scribed on the body 10. The shaft 40 has cylindrical portions 48 and 50 respectively received in the openings defined by the bearings 22 and 24. The cylindrcal portions 48 and 50 are concentric. Intermediate the concentric cylindrical portions 48 and 50 the shaft is provided with an eccentric cylindrical portion 52 whose diameter is intermediate the diameter of the portions 48 and 50.

Figure 3:
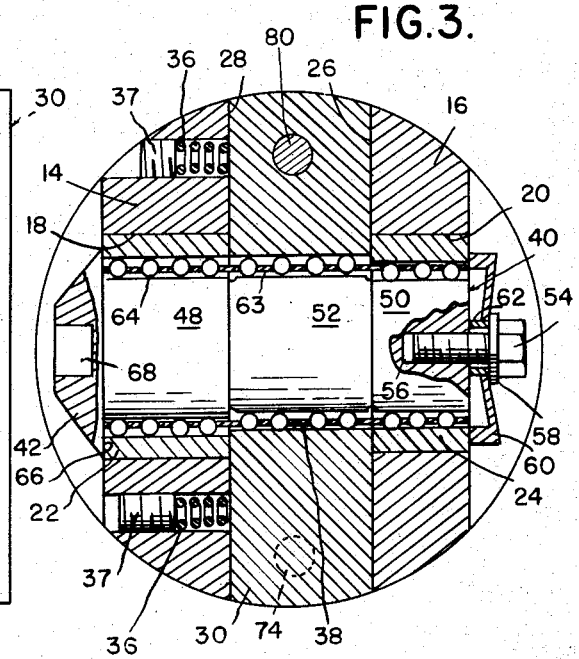
Fig. 3 is a sectional view on the line 3—3, Fig. 2.

The shaft 40 is assembled as best seen in Fig. 3 and is retained in position by a cap screw 54 threaded into a recess 56 at the end of the shaft 40 opposite its head 42. The cap screw is provided with a washer 58 engaging a spring cup 60, the periphery of the cup engaging the annular bearing 24. An annular spacer 62 is provided extending through an opening in the cup and serves as an abutment between the end of the shaft 40 and the washer 58.

Pre-loaded ball bearing means are provided intermediate each of the shaft portions 48, 50 and 52 and the openings in which these portions are received. It was previously noted that shaft portions 48 and 50 were received in hardened annular bearings 22 and 24. No similar bearing is necessary to surround the shaft portion 52, since the block 30 is itself formed of hardened steel.

It is contemplated that the amount of eccentricity of the shaft portion 52 will be only a few thousandths of an inch. This permits the use of pre-loaded ball bearing means constituting a single elongated bearing retainer or cage 63 having openings therein each receiving identical balls 64.

The foregoing construction further permits the assembly of the shaft 40 and bearing retainer 63 and balls 64 into the assembly through the large bearing 22. Thus the bearings 22 and 24 may be pressed in place prior to assembly of the ball bearings and shaft.

The spring cup 60 establishes pressure between the inner surface of the head 42 of the shaft and the adjacent surface of the body 10 at the zone indicated at 66. The amount of friction thus developed is determined by the dimensions of the spacer 62. It is contemplated that the amount of frictional resistance developed by this construction shall be sufficient to prevent accidental rotation of the shaft 40 while at the same time ready rotation of the shaft by a suitable tool applied to the hexagonal recess 68 when it is desired to effect a slight adjustment of the block 30. Other means such as a spanner applied to holes 69 may be employed.

Figure 2:
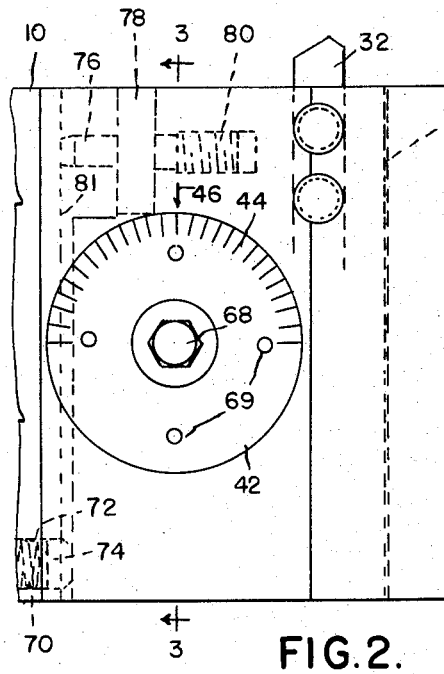
Fig. 2 is a view of the structure shown in Fig. 1 looking in the direction of the arrows 2—2, Fig. 1.

From the construction as thus far described it will be observed that the block 30 is rotatable about the shaft 40. In order to retain the block 30 accurately in any preset position, relative strong spring means including the compression spring 70 seated in a recess 72 formed in the body 10 is provided, the spring having a plunger 74 engaging against an end portion of the block 30. Thus, the spring means tends to rock the block counterclockwise in the position shown in Fig. 2. Preferably, an adjustable abutment comprising a screw 76 is provided, this abutment having a radially enlarged portion 78 and a threaded portion 80 received in a threaded recess in the block 30. The spring 70 maintains the abutment 76 at all times in engagement with the end wall 81 of the opening 12.

When it is desired to effect a slight adjustment of the block 30, and in particular of the tool bit 32, the shaft 40 is rotated. During such rotation of the shaft 40, the eccentric relationship of the shaft portion 52 causes movement of the block 30, this movement being compounded by virtue of the engagement between the abutment 76 and the surfaces 81 of the body to produce essentially in and out movement of the tool bit 32.

The balls 64 are very small as for example from .062 to .250 inch in diameter. Excellent results have been obtained using balls .125 inch in diameter. The balls are relatively closely spaced and accordingly provide for substantially rigid support of the adjustable block 30 during a cutting operation. At the same time they provide for rotation of the shaft 40 when the friction established by the spring cup 60 is overcome.

The drawings and the foregoing specification constitute a description of the improved boring bar in such full, clear, concise and exact terms as to enable any person skilled in the art to practice the invention, the scope of which is indicated by the appended claims.

What we claim as our invention is:

1. Coupling structure comprising a body having a first opening therein having opposed parallel surfaces, a block in said opening having a sliding fit with said surfaces, said block and body having generally aligned cylindrical openings extending in a direction perpedicular to and intersecting said surfaces, an adjusting shaft in said aligned openings having concentric portions received in the openings in said body and an eccentric portion received in the opening in said block, pre-loaded bearing means between the concentric portions of said shaft and said body and between the eccentric portion of said shaft and said block, slidable guide means acting between said block and body, spring means maintaining said guide means in slidable contact, and friction means between said shaft and body to oppose rotation of said shaft.

2. Coupling structure comprising a body having a first opening therein having opposed parallel surfaces, a block in said opening having a sliding fit with said surfaces, said block and body having generally aligned cylindrical openings extending in a direction perpendicular to and intersecting said surfaces, an adjusting shaft in said aligned openings having concentric portions received in the openings in said body and an eccentric portion received in the opening in said block, pre-loaded bearing means between the concentric portions of said shaft and said body and between the eccentric portion of said shaft and said block, said block having an abutment thereon engaging a third surface of the first opening intermediate its said parallel surfaces, spring means between said block and said third surface to urge said abutment against said third surface, and friction means between said shaft and body to oppose rotation of said shaft.

3. Coupling structure comprising a body having a first opening therein having opposed parallel surfaces, a block in said opening having a sliding fit with said surfaces, said block and body having generally aligned cylindrical openings extending in a direction perpendicular to and intersecting said surfaces, an adjusting shaft in said aligned openings having concentric portions received in the openings in said body and an eccentric portion received in the opening in said block, pre-loaded bearing means between the concentric portions of said shaft and said body and between the eccentric portion of said shaft and said block, said block having an adjustable abutment thereon engaging a third surface of the first opening intermediate its said parallel surfaces, spring means between said block and said third surface to urge said abutment against said third surface, and friction means between said shaft and body to oppose rotation of said shaft.

4. Coupling structure comprising a body having spaced parallel walls provided with concentric cylindrical openings, a block slidably received between said walls and having an opening generally aligned with said concentric openings, a shaft having portions received in all of said openings, the portions received in said wall openings being concentric, the portion received in the opening in said block being slightly eccentric to the other portions, pre-loaded bearings between said openings and the shaft portions therein, friction means between said body and shaft opposing rotation of said shaft, said block being rotatable on said shaft, and spring means acting between said block and said body holding said block against a portion of said body connecting said walls.

5. Coupling structure comprising a body having spaced parallel walls provided with concentric cylindrical openings, a block slidably received between said walls and having an opening generally aligned with said concentric openings, a shaft having portions received in all of said openings, the portions received in said wall openings being concentric, the portion received in the opening in said block being slightly eccentric to the other portions, pre-loaded bearings between said openings and the shaft portions therein, friction means between said body and shaft opposing rotation of said shaft, said block being rotatable on said shaft, an adjustable abutment on said block engageable with a portion of said body intermediate said walls, and resilient means acting between said body and said block holding said abutment against said body portion.

6. Structure of the character described comprising a body having a flat support surface and an opening of circular cross-section perpendicular to and intersecting said surface, a block having a flat surface in sliding contact with the flat surface of said body, said block having an opening of circular cross-section perpendicular to its aforesaid surface and in general alignment with the opening in said body, an adjusting shaft having relatively eccentric portions of circular cross-section received in the openings of said body and block, abutment means between said body and block engageable to limit rotation of said block about said shaft relative to said body in one direction, resilient means acting between said body and said block tending to rotate said block on said shaft in said one direction and thus to maintain said abutment means in engagement, and other resilient means acting between said body and said block urging said block into firm contact with the said surface of said body.

7. Structure of the character described comprising a body having a flat support surface and an opening of circular cross-section perpendicular to and intersecting said surface, a block having a flat surface in sliding contact with the flat surface of said body, said block having an opening of circular cross-section perpendicular to its aforesaid surface and in general alignment with the opening in said body, an adjusting shaft having relatively eccentric portions of circular cross-section received in the openings of said body and block, a cage of pre-loaded ball bearings between the shaft and said openings, abutment means between said body and block engageable to limit rotation of said block about said shaft relative to said body in one direction, and resilient means acting between said body and said block tending to rotate said block on said shaft in said one direction and thus to maintain said abutment means in engagement.

8. A support for a tool subjected in use to a thrust acting thereon substantially in a single direction comprising a body having a flat support surface substantially perpendicular to said direction of thrust, said body having an opening of circular cross-section perpendicular to said surface, a tool holder having a flat surface slidably engaging the flat surface of said body and having an opening of circular cross-section perpendicular to said surfaces and generally aligned with the opening in said body, a tool adjusting shaft having relatively eccentric portions of circular cross-section received in said openings, abutment means disposed between said body and holder to limit rotation of said holder on said shaft relative to said body in one direction, said abutment means including relatively slidable guide surfaces arranged to control the direction of movement of a tool on said holder, and resilient means acting between said body and holder tending to rotate said holder on said shaft in said one direction to maintain said abutment means in engagement.

9. A support for a tool subjected in use to a thrust acting thereon substantially in a single direction comprising a body having a flat support surface substantially perpendicular to said direction of thrust, said body having an opening of circular cross-section perpendicular to said surface, a tool holder having a flat surface slidably engaging the flat surface of said body and having an opening of circular cross-section perpendicular to said surfaces and generally aligned with the opening in said body, a tool adjusting shaft having relatively eccentric portions of circular cross-section received in said openings, abutment means disposed between said body and holder to limit rotation of said holder on said shaft relative to said body in one direction, said abutment means including relatively slidable guide surfaces arranged to control the direction of movement of a tool on said holder, resilient means acting between said body and holder tending to rotate said holder on said shaft in said one direction to maintain said abutment means in engagement, and other resilient means acting between said body and said holder urging said holder firmly against the flat surface of said body.

10. A support for a tool subjected in use to a thrust acting thereon substantially in a single direction comprising a body having a flat support surface substantially perpendicular to said direction of thrust, said body having an opening of circular cross-section perpendicular to said surface, a tool holder having a flat surface slidably engaging the flat surface of said body and having an opening of circular cross-section perpendicular to said surfaces and generally aligned with the opening in said body, a tool adjusting shaft having relatively eccentric portions of circular cross-section received in said openings, abutment means disposed between said body and holder to limit rotation of said holder on said shaft relative to said body in one direction, said abutment means including relatively slidable guide surfaces arranged to control the direction of movement of a tool on said holder, resilient means between said body and holder tending to rotate said holder on said shaft in said one direction to maintain said abutment means in engagement, friction means connected to said shaft to oppose rotation thereof with a force sufficient to prevent accidental rotation in use but to permit manual adjustment thereof, and other resilient means acting between said body and said holder urging said holder firmly against the flat surface of said body.

11. A support for a tool subjected in use to a thrust acting thereon substantially in a single direction comprising a body having a flat support surface substantially perpendicular to said direction of thrust, said body having an opening of circular cross-section perpendicular to said surface, a tool holder having a flat surface slidably engaging the flat surface of said body and having an opening of circular cross-section perpendicular to said surfaces and generally aligned with the opening in said body, a tool adjusting shaft having relatively eccentric portions of circular cross-section received in said openings, abutment means disposed between said body and holder to limit rotation of said holder on said shaft relative to said body in one direction, said abutment means including relatively slidable guide surfaces arranged to control the direction of movement of a tool on said holder, resilient means acting between said body and holder tending to rotate said holder on said shaft in said one direction to maintain said abutment means in engagement, and friction means connected to said shaft to oppose rotation thereof with a force sufficient to prevent accidental rotation in use but to permit manual adjustment thereof.

12. A support for a tool subjected in use to a thrust acting thereon substantially in a single direction comprising a body having a flat support surface substantially perpendicular to said direction of thrust, said body having an opening of circular cross-section perpendicular to said surface, a tool holder having a flat surface slidably engaging the flat surface of said body and having an opening of circular cross-section perpendicular to said surfaces and generally aligned with the opening in said body, a tool adjusting shaft having relatively eccentric portions of circular cross-section received in said openings, adjustable abutment means disposed between said body and holder to limit rotation of said holder on said shaft relative to said body in one direction, said abutment means including relatively slidable guide surfaces arranged to control the direction of movement of a tool on said holder, and resilient means acting between said body and holder tending to rotate said holder on said shaft in said one direction to maintain said abutment means in engagement.

13. A support for a tool subjected in use to a thrust acting thereon substantially in a single direction comprising a body having a flat support surface substantially perpendicular to said direction of thrust, said body having an opening of circular cross-section perpendicular to said surface, a tool holder having a flat surface slidably engaging the flat surface of said body and having an opening of circular cross-section perpendicular to said surfaces and generally aligned with the opening in said body, a tool adjusting shaft having relatively eccentric portions of circular cross-section received in said openings, a cage of pre-loaded ball bearings between the shaft and said openings, abutment means disposed between said body and holder to limit rotation of said holder on said shaft relative to said body in one direction, said abutment means including relatively slidable guide surfaces arranged to control the direction of movement of a tool on said holder, and resilient means acting between said body and holder tending to rotate said holder on said shaft in said one direction to maintain said abutment means in engagement.

14. Tool support structure comprising a body having spaced parallel walls provided with concentric cylindrical openings, a block slidably received between said walls and having an opening generally aligned with said concentric openings, a shaft having portions received in all of said openings, the portions received in said wall openings being concentric, the portion received in the opening in said block being slightly eccentric to the other portions, friction means between said body and shaft opposing rotation of said shaft, said block being rotatable on said shaft, abutment means secured to said block and operable between said body and block to limit rotation of said block on said shaft, and spring means acting between said block and said body holding said abutment against a portion of said body connecting said walls.

15. Tool support structure comprising a body having spaced parallel walls provided with concentric cylindrical openings, a block slidably received between said walls and having an opening generally aligned with said concentric openings, a shaft having portions received in all of said openings, the portions received in said wall openings being concentric, the portion received in the opening in said block being slightly eccentric to the other portions, said block being rotatable on said shaft, abutment means adjustably secured to said block and operable between said body and block to limit rotation of said block on said shaft, and spring means acting between said block and said body holding said abutment against a portion of said body connecting said walls.

References Cited in the file of this patent

UNITED STATES PATENTS

| | | |
|---|---|---|
| 1,736,449 | Lipp | Nov. 19, 1929 |
| 2,324,291 | Dodge | July 13, 1943 |
| 2,437,738 | Hanggi | Mar. 16, 1948 |
| 2,660,463 | Briney | Nov. 24, 1953 |

FOREIGN PATENTS

| | | |
|---|---|---|
| 107,220 | Great Britain | June 28, 1917 |